Dec. 25, 1934.　　　　G. L. HOMMEL　　　　1,985,499

OPHTHALMIC MOUNTING

Filed March 2, 1933

GEORGE L. HOMMEL
INVENTOR

BY  *J. A. Ellestad*
ATTORNEY

Patented Dec. 25, 1934

1,985,499

UNITED STATES PATENT OFFICE 1,985,499

OPHTHALMIC MOUNTING

George L. Hommel, Irondequoit, N. Y., assignor to Bausch & Lomb Optical Company, Rochester, N. Y., a corporation of New York Application March 2, 1933, Serial No. 659,279

7 Claims. (Cl. 88—47)

This invention relates to ophthalmic mountings and more particularly it has reference to mountings which are attached to lenses to provide rimless spectacles.

One of the objects of my invention is to provide an improved ophthalmic mounting and method of making same. Another object is to provide an improved rimless mounting which can be attached firmly and quickly to a lens without the use of screws. A further object is to provide a rimless mounting having, on the inner surface of one or both lens straps, a groove or grooves positioned so that a portion of the plastic material of the retaining element can be forced into the grooves. These and other objects and advantages reside in certain novel features of construction, arrangement and combination of parts and in the method of constructing and combining said parts, as will hereinafter be described.

Referring to the drawing.

Figure 7:
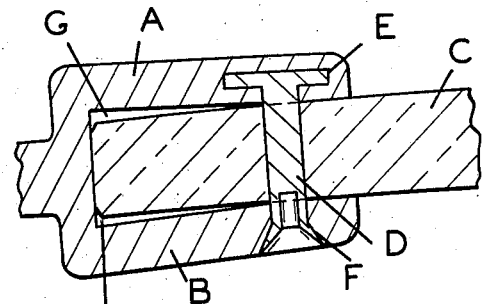
Fig. 7 is a sectional view showing a mounting of the prior art secured to a lens.

In certain types of rimless mountings such as that disclosed in United States Letters Patent No. 1,878,371, for example, a fusible retaining element is used for securing the mounting to the lens. As shown in Fig. 7, such a mounting comprises two strap members A and B positioned on opposite faces of the lens C. The fusible retaining element D is rendered plastic by heat and then forced into engagement with the anchoring means E and F on the straps. Due to the variation in lens thicknesses and fitting difficulties, it often happens that the lens straps do not fit snugly down onto the respective lens surfaces so that gaps occur between the straps and the lens surfaces as shown at G in Fig. 7. This obviously provides an insecurely mounted lens which might work loose and wobble. This trouble is eliminated in my improved mountings which will now be described.

A preferred embodiment of my invention is shown on Figs. 1-4 wherein 10 indicates a member which has the two spaced lens straps 11 and 12 and the intermediate shoe 13. The mounting is placed on the lens L with the shoe 13 contacting the edge and the straps contacting the respective faces of the lens. An undercut recess 14 is provided on the inner face of strap 11 while strap 12 is provided with a countersunk aperture 15. A fusible retaining element 16 is inserted through aperture 15 and the opening 17 in the lens. Heat is applied so that the element is rendered plastic and upon the application of pressure the plastic material is forced into the recess 14 and the countersunk aperture 15 thereby anchoring the element and securing the mounting to the lens. The retaining element 16 is preferably made of a fusible, non-metallic material such as the pyroxylin material sold under the trade-mark "Lumarith".

Figure 1:
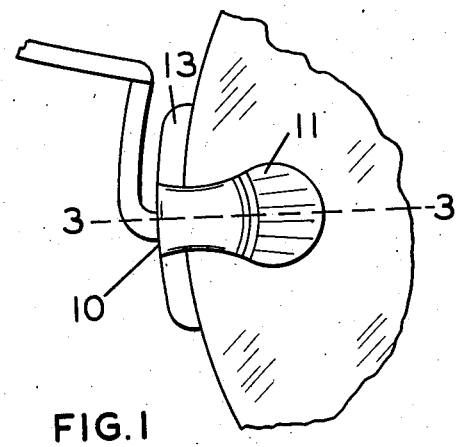
Fig. 1 is a fragmentary view of a rimless mounting embodying my invention.
Figure 2:
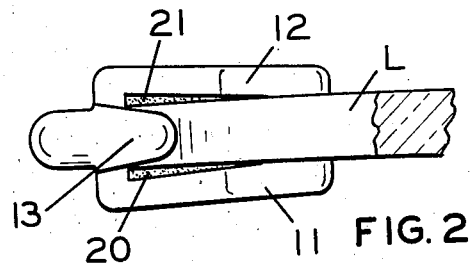
Fig. 2 is a top plan view of the same.
Figure 3:
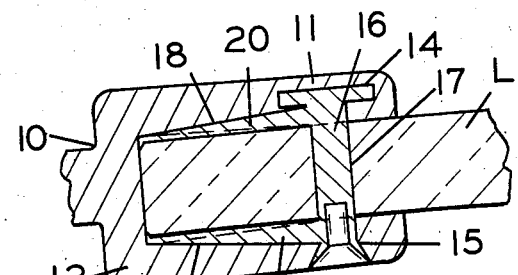
Fig. 3 is a sectional view on line 3—3 of Fig. 1.
Figure 4:
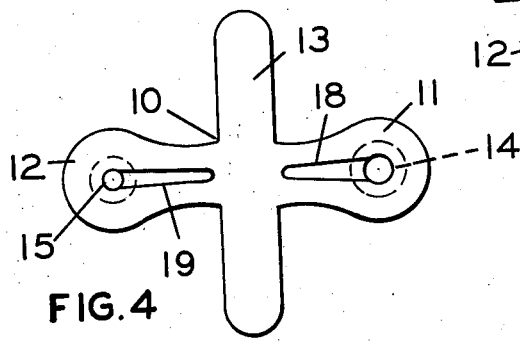
Fig. 4 is a plan view of a blank from which my mounting is made.

On the inner face of strap 11 there is formed an elongated groove 18 which extends from the recess 14 to the shoe 13 while a similar groove 19, extending from the aperture 15 to the shoe 13, is provided on the inner face of strap 12. The grooves preferably vary in depth, with their greatest depths near the outer ends of the straps as shown in Fig. 3.

In attaching my mounting to the lens L, the fusible retaining element 16, preferably in cylindrical form, is positioned in the aperture 15 and the opening 17 and with its end resting on the bottom of recess 14. Heat is then applied so that the element becomes plastic and pressure is then applied so as to force the plastic material into intimate engagement with the recess 14 and the countersunk aperture 15 thereby anchoring the member and securing the mounting to the lens. Since the grooves 18 and 19 are in positive communication with the recess 14 and aperture 15, respectively, some of the plastic material will also be forced into these grooves as shown at 20 and 21 on Figs. 2 and 3. This provides a firm seat for the lens L and insures a tight lens irrespective of whether the strap fits snugly against the faces of the lens. Hence, the gaps G of the prior art mountings are eliminated and mountings can be securely attached with a minimum amount of fitting.

Figure 5:
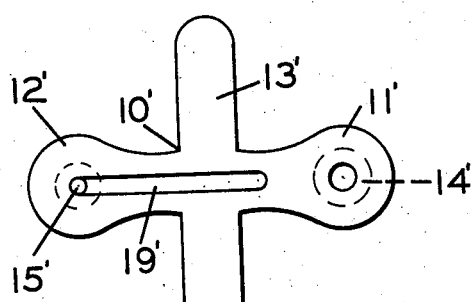
Fig. 5 is a plan view of another form of blank for making a modified mounting.
Figure 6:
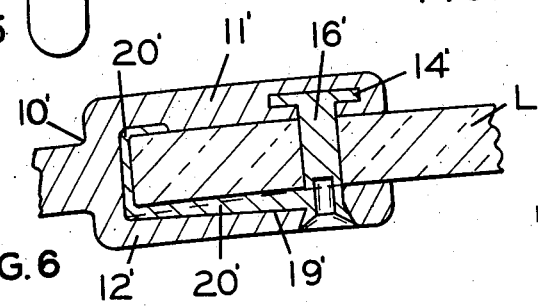
Fig. 6 is a sectional view showing the modified mounting secured to a lens.

A modification is shown in Figs. 5 and 6 wherein 10' indicates a member having the two straps 11' and 12' and the intermediate shoe portion 13'. The strap 11' has an undercut recess 14' and strap 12' has the countersunk aperture 15'. The fusible retaining element 16' is anchored by heat and pressure in a manner hereinbefore described. Instead of providing grooves on the inner face of each strap, however, I provide one elongated groove 19' which extends from the aperture 15' along the inner face of strap 12', across the shoe 13' and partially on to strap 11' as clearly shown in Figs. 5 and 6. When pressure is applied to the plastic element 16' some of the plastic material is forced into the groove 19' as shown at 20'. Since this groove extends around the edge of the lens to the other surface, the mounting will be securely seated with a minimum amount of fitting.

From the foregoing, it will be apparent that I am able to attain the objects of my invention and provide an improved ophthalmic mounting which can be attached securely to a lens with a minimum amount of fitting. Various modifications can obviously be made without departing from the spirit of my invention.

I claim:

1. An ophthalmic mounting comprising a member having two spaced straps in contact with the surfaces of a lens having an opening, anchoring means on each of said straps, said anchoring means being in communication with the lens opening, a fusible retaining element positioned in and contacting said opening and secured by said anchoring means, one of said straps having a groove on its inner face, said groove being in communication with the anchoring means, said groove being substantially filled with a fusible material which is integral with said retaining element.

2. An ophthalmic mounting comprising a member having two spaced lens straps positioned, respectively, on opposite faces of a lens having an opening, one of said straps being provided with an aperture and a groove on its inner face, a retaining element positioned in said opening and aperture, said element having an integral projection which is positioned in said groove.

3. An ophthalmic mounting comprising a member having a pair of spaced lens straps contacting, respectively, with opposite faces of a lens having an opening, one of said straps having an aperture in alignment with said opening, a retaining element positioned in said aperture and opening, said element being formed of a fusible material, the apertured strap being provided with a groove on its inner face, said groove being in communication with said aperture, said groove being substantially filled with fusible material which is integral with said retaining element.

4. An ophthalmic mounting comprising a member having two spaced lens straps in contact with the surfaces of a lens having an opening, each of said straps having anchoring means opposite said opening, a fusible retaining element positioned in said opening and secured by said anchoring means, each of said straps having on its inner face a groove which communicates with the anchoring means, said groove being substantially filled with the same material as that of said element.

5. An ophthalmic mounting comprising a member having two spaced straps positioned, respectively, on opposite faces of a lens having an opening, one of the straps having an undercut recess on its inner face, the other strap having an aperture, said straps having grooves on their inner faces which are in communication with said recess and aperture, respectively, a fusible retaining element positioned in said aperture and opening and anchored in said recess and integral projections on said element, said projections being positioned, respectively, in said grooves.

6. An ophthalmic mounting comprising a member having two spaced lens straps and an intermediate shoe portion, said straps being positioned, respectively, on opposite faces of a lens having an opening with said shoe portion in contact with the edge of the lens, one of said straps having an aperture and anchoring means and being provided with a groove on its inner face, said groove being in communication with said aperture and anchoring means and extending therefrom across said shoe portion to the other strap, and a fusible retaining element positioned in said opening anchoring means and aperture, said groove being substantially filled with said fusible material.

7. An ophthalmic mounting comprising a member having two spaced lens straps and an intermediate portion, said straps being positioned, respectively, on opposite sides of a lens having an opening, one of said straps being provided with an aperture, said strap having a groove on its inner face which extends from the aperture and across said intermediate portion to the inner face of the other strap, and a retaining element positioned in said opening and aperture, said element having an integral projection which is positioned in said groove.

GEORGE L. HOMMEL.